(12) United States Patent
Anzai et al.

(10) Patent No.: US 8,047,431 B2
(45) Date of Patent: Nov. 1, 2011

(54) PORTABLE TERMINAL, NONCONTACT IC MODULE, READER/WRITER AND INFORMATION DISTRIBUTION METHOD

(75) Inventors: Jun Anzai, Kanagawa (JP); Hiroaki Fukuoka, Kanagawa (JP)

(73) Assignee: Panasonic Corporation, Osaka (JP)

( * ) Notice: Subject to any disclaimer, the term of this patent is extended or adjusted under 35 U.S.C. 154(b) by 204 days.

(21) Appl. No.: 12/441,331

(22) PCT Filed: Sep. 15, 2006

(86) PCT No.: PCT/JP2006/318413
§ 371 (c)(1),
(2), (4) Date: Mar. 13, 2009

(87) PCT Pub. No.: WO2008/032409
PCT Pub. Date: Mar. 20, 2008

(65) Prior Publication Data
US 2009/0266886 A1 Oct. 29, 2009

(51) Int. Cl.
*G06K 5/00* (2006.01)
(52) U.S. Cl. ........ 235/382; 235/379; 235/380; 235/492; 340/10.1; 340/10.4; 340/10.41; 340/10.5
(58) Field of Classification Search .................. 235/379, 235/380, 492; 340/10.1, 10.4, 10.41, 10.5
See application file for complete search history.

(56) References Cited

U.S. PATENT DOCUMENTS

| | | | |
|---|---|---|---|
| 7,365,642 B2 * | 4/2008 | Tabayashi et al. | 340/505 |
| 2002/0160805 A1 * | 10/2002 | Laitinen et al. | 455/550 |
| 2003/0054805 A1 | 3/2003 | Fujisawa | |
| 2005/0023345 A1 * | 2/2005 | Furuyama et al. | 235/382 |

FOREIGN PATENT DOCUMENTS

| | | |
|---|---|---|
| EP | 0 980 053 | 2/2000 |
| JP | 2000-200319 | 7/2000 |
| JP | 2001-282684 | 10/2001 |
| JP | 2002-288068 | 10/2002 |
| JP | 2003-255878 | 9/2003 |
| JP | 2003-330401 | 11/2003 |
| JP | 2004-080617 | 3/2004 |
| JP | 2005-050233 | 2/2005 |
| JP | 2005-050262 | 2/2005 |
| JP | 2005-234844 | 9/2005 |
| JP | 2006-109358 | 4/2006 |

OTHER PUBLICATIONS

International Search Report dated Jun. 12, 2007.
Japanese Office Action dated Apr. 12, 2011.
Japanese Office Action dated Jul. 19, 2011.

* cited by examiner

*Primary Examiner* — Daniel Hess
*Assistant Examiner* — Michael Andler
(74) *Attorney, Agent, or Firm* — Dickinson Wright PLLC

(57) ABSTRACT

Provided is a portable terminal (100) which can perform pseudo push distribution and display of a message obtained in response to a request from a reader/writer from a noncontact IC card by noncontact communication which is difficult to be always connected with. A noncontact IC card, a reader/writer and information distribution method are also provided. The noncontact IC card for receiving a message transmitted from the reader/writer by noncontact communication is mounted on the portable terminal (100). The message transmitted from the reader/writer is provided with an event header wherein setting conditions for specifying a message to be displayed by the portable terminal (100) are indicated. The portable terminal is provided with a message acquiring section (103) for acquiring only a message that satisfies the setting conditions indicated on the event header, from the noncontact IC card which has received messages, and a display section (106) which displays the message acquired from the message acquiring section (103).

5 Claims, 4 Drawing Sheets

| TYPE | VALUE | EQUATION | ESSENTIALITY | DISPLAY |
|------|-------|----------|--------------|---------|
| Time | 8/8 | Equal | M | Telop |

| MESSAGE | ACHIEVED/NOT ACHIEVED | REQUEST INFORMATION | ESSENTIALITY | DISPLAY |
|---------|----------------------|---------------------|--------------|---------|
| 1100 | ACHIEVED (ON) | Time | M | Telop |

PORTABLE TERMINAL, NONCONTACT IC MODULE, READER/WRITER AND INFORMATION DISTRIBUTION METHOD

TECHNICAL FIELD

The present invention relates to a portable terminal mounted with a non-contact IC module carrying out non-contact communication, which is difficult to be connected all the time with a reader/writer (R/W), the non-contact IC module, the reader/writer and an information delivery method.

BACKGROUND ART

There are conventionally information delivery methods using a push-type information delivery technique whereby information is sent directly from a server to a portable terminal such as the user's cellular phone without the user's approach.

As a system and portable terminal or the like that carries out communication using this type of information delivery method, the "information delivery mediation system" described in Patent Document 1, "portable information device" described in Patent Document 2 and "portable terminal mounted with IC module" described in Patent Document 3 are known.

The "information delivery mediation system" described in Patent Document 1 converts, upon discovering a delivery date and time registered through an on-line channel and current date and time information stored in a computer, the information delivery contents registered in combination with the delivery date and time to e-mail data and transmits the e-mail data to the e-mail address of a cellular phone or a portable terminal registered through the on-line channel beforehand.

According to this "information delivery mediation system," it is possible to deliver information to a cellular phone or portable terminal of a specific customer on a specified date and time using an e-mail service.

Meanwhile, the "portable information device" described in Patent Document 2 changes information to be displayed on a display screen of a wrist watch type information device to publicity information which is predetermined information, advertisement information or information urging the user's action (visit to amusement facilities or the like) based on the time elapsed after a predetermined reference time set by an attraction system or the remaining time until a predetermined reference time.

This "portable information device" can effectively use the information processing function of a non-contact IC module and display publicity information or advertisement information on the display screen of the wrist watch type information device in amusement facilities such as a theme park.

Furthermore, the "portable terminal mounted with an IC module" described in Patent Document 3 is provided with a memory in which a secure element (IC module) having an IC card function stores data of a service-related state and a control section that performs control so that service-related processing is performed through non-contact communication with a service terminal provided in a predetermined place. Furthermore, the portable terminal is provided with a processing decision section that decides whether or not a change made without requesting the user for verification satisfies a condition set so as to call the user's attention and instructs a display section of the portable terminal to report to the user based on a decision that the change satisfies the condition.

Even when set to be password free, this portable terminal can report, when processing that should call the user's attention is performed through communication between a service terminal and IC module, this to the user using a user interface function of the portable terminal so as to allow the user to easily check whether or not unintended processing or an error has occurred.

Patent Document 1: Japanese Patent Application Laid-Open No. 2001-282684
Patent Document 2: Japanese Patent Application Laid-Open No. 2002-288068
Patent Document 3: Japanese Patent Application Laid-Open No. 2005-50262

DISCLOSURE OF INVENTION

Problems to be Solved by the Invention

By the way, the "information delivery mediation system" described in Patent Document 1 can push-deliver information to the user's portable terminal by e-mail using the time specified by the mediation server as a condition.

However, this "information delivery mediation system" has difficulty in push-delivering information having conditions specific to the non-contact IC module, for example, information such as the balance of electronic money and the name of a station, through a ticket gate of which the user has passed, to the portable terminal and displaying the information without depending on user operation.

Furthermore, the "portable information device" described in Patent Document 2 assumes a combination non-contact antenna/portable terminal that displays information changed to information calling attention to event information or the like received from a reader/writer (R/W) according to a time elapsed from a predetermined reference time or a remaining time until a predetermined reference time.

Therefore, as in the case of a cellular phone mounted with a non-contact IC module, when a non-contact IC module that controls non-contact communication is separated from a portable terminal that analyzes a message and controls its display, the non-contact IC module in this "portable information device" cannot perform access control about a message over the portable terminal.

Furthermore, the "portable terminal mounted with an IC module" described in Patent Document 3 can report a change of data resulting from non-contact communication processing under a condition specific to non-contact communication to the user, but cannot acquire a request message received from a reader/writer from the non-contact IC module according to the condition for each message to make the portable terminal execute processing.

It is therefore an object of the present invention to provide a portable terminal, a non-contact IC module, a reader/writer and an information delivery method capable of push-delivering and executing, in a pseudo-manner, processing described in a message acquired from the non-contact IC module through non-contact communication, which is difficult to be connected all the time, at the request of the reader/writer.

Means for Solving the Problem

The portable terminal of the present invention is a portable terminal mounted with a non-contact IC module that receives a message transmitted from a reader/writer through non-contact communication, the message transmitted from the reader/writer including an event header describing a setting condition for specifying processing to be executed by the portable terminal and adopts a configuration including a message acquisition section that acquires only a message that has achieved the setting condition described in the event header from the non-contact IC module which has received the message and a processing section that executes the processing described in the message acquired from the message acquisition section.

The non-contact IC module of the present invention is a non-contact IC module mounted in a portable terminal that receives a message transmitted through non-contact communication from a reader/writer, the message transmitted from the reader/writer including an event header that describes a setting condition for specifying processing to be executed by the portable terminal, and adopts a configuration including an event header analyzing section that analyzes the event header provided for the message received from the reader/writer and a flag setting section that sets a flag reflecting the setting condition described in the event header analyzed and obtained by the event header analyzing section, wherein when the message flag specified by a message acquisition request from the portable terminal has achieved the setting condition described in the event header, the portable terminal is permitted to acquire the message.

The reader/writer of the present invention is a reader/writer that communicates with a non-contact IC module mounted in a portable terminal through non-contact communication and adopts a configuration in which a message provided with an event header describing a setting condition for specifying processing to be executed by the portable terminal is transmitted through non-contact communication.

The information delivery method of the present invention is an information delivery method for transmitting a message transmitted from a reader/writer to a non-contact IC module mounted in a portable terminal through non-contact communication, the message transmitted from the reader/writer including an event header describing a setting condition for specifying processing to be executed by the portable terminal, the non-contact IC module including an event header analyzing step of analyzing the event header provided for the message received from the reader/writer, a flag setting step of setting a flag reflecting the setting condition described in the event header analyzed and obtained in the event header analyzing step and a message acquisition permitting step of permitting, when the message flag specified by a message acquisition request from the portable terminal has achieved the setting condition described in the event header, the portable terminal to acquire the message, the portable terminal including a flag analyzing step of searching whether or not there is a message that can be acquired by the non-contact IC module and analyzing the presence/absence of a flag that has achieved the setting condition described in the event header from a state of the flag set in the flag setting step, a message acquiring step of acquiring only a message decided in the flag analyzing step to have achieved the setting condition described in the event header and permitted in the message acquisition permitting step from the non-contact IC module and a processing step of executing the processing described in the message acquired by the message acquisition section.

Advantageous Effect of the Invention

According to the present invention, it is possible to push-deliver and execute, in a pseudo-manner, processing described in a message acquired from the non-contact IC module through non-contact communication, which is difficult to be connected all the time, at the request of the reader/writer.

BEST MODE FOR CARRYING OUT THE INVENTION

Figure 1:
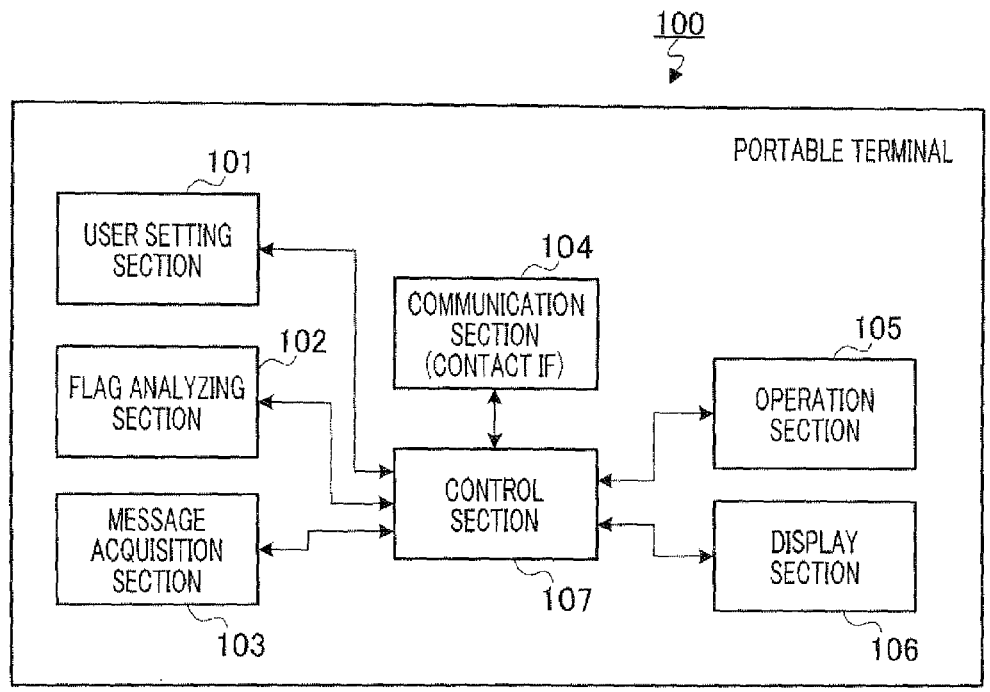
FIG. 1 is a block diagram showing a configuration of main parts of a portable terminal according to an embodiment of the present invention.

Hereinafter, an embodiment of the present invention will be explained in detail with reference to the accompanying drawings. First, the configuration of main parts of a portable terminal according to an embodiment of the present invention will be explained. FIG. 1 is a block diagram showing a configuration of main parts of the portable terminal according to an embodiment of the present invention. Here, a non-contact IC module will be explained by taking a non-contact IC card as an example.

As shown in FIG. 1, portable terminal 100 of the present embodiment is provided with user setting section 101, flag analyzing section 102, message acquisition section 103, communication section 104, operation section 105, display section 106 and control section 107.

In FIG. 1, user setting section 101 performs processing of setting display conditions for a message to be displayed on display section 106 through user operation of operation section 105.

Flag analyzing section 102 makes a flag check to analyze the presence/absence of a flag that has achieved a setting condition described in an event header of a message transmitted from reader/writer (R/W) 300 which will be described later to non-contact IC card 200 through non-contact communication.

Message acquisition section 103 performs message acquisition processing for acquiring a message transmitted from reader/writer 300 to non-contact IC card 200 through non contact communication and stored in first storage section 202 of non-contact IC card 200.

Communication section 104 has a contact IF (interface), which is connected to a contact IF (interface) of communication section 204 of non-contact IC card 200, and carries out contact communication with communication section 204 of non-contact IC card 200.

Operation section 105 is provided with a ten-key numeric pad and function keys or the like and carries out data input processing or the like through user operation.

Display section 106 is provided with a liquid crystal panel or the like and displays characters and images inputted through user operation of operation section 105 and messages acquired by message acquisition section 103 from first storage section 202 of non-contact IC card 200 or the like.

Control section 107 performs processing of inputting/outputting signals to/from user setting section 101, flag analyzing section 102, message acquisition section 103, communication section 104, operation section 105 and display section 106, and data calculation processing.

Figure 2:
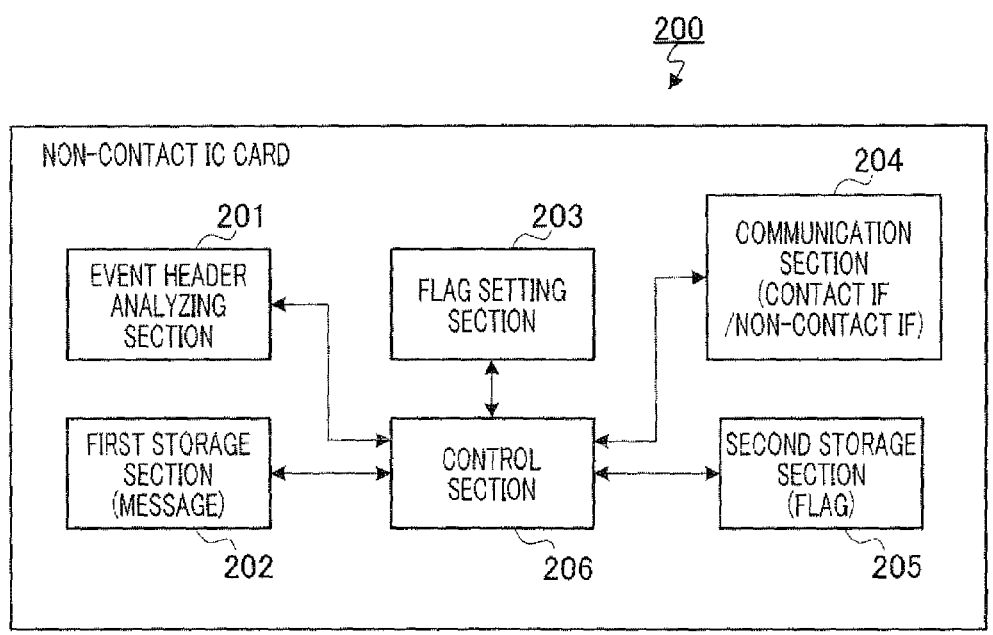
FIG. 2 is a block diagram showing a configuration of main parts of a non-contact IC card mounted in a portable terminal according to the embodiment of the present invention.

Next, the configuration of main parts of a non-contact IC card mounted in portable terminal 100 of the present embodiment will be explained. FIG. 2 is a block diagram showing the configuration of main parts of the non-contact IC card mounted in the portable terminal according to the embodiment of the present invention.

As shown in FIG. 2, non-contact IC card 200 mounted in portable terminal 100 of the present embodiment is provided with event header analyzing section 201, first storage section 202, flag setting section 203, communication section 204, second storage section 205 and control section 206.

In FIG. 2, event header analyzing section 201 performs event header analysis processing for analyzing an event header provided for a non-contact communication message transmitted from reader/writer 300 through non-contact communication.

First storage section 202 stores a message received through user operation or from reader/writer 300 through non-contact communication.

Flag setting section 203 performs flag setting processing of setting a flag to an "ON" state reflecting a setting condition described in the event header analyzed and obtained by event header analyzing section 201.

Communication section 204 has a contact IF (interface) connected to the contact IF (interface) of communication section 104 of portable terminal 100 and carries out contact communication with communication section 104 of portable terminal 100.

Second storage section 205 is provided with a storage area (common storage area) common to types of non-contact IC card 200 and card manufacturing companies and stores the state of the flag set in flag setting section 203 in this common storage area.

Control section 206 performs processing of inputting/outputting signals to/from event header analyzing section 201, first storage section 202, flag setting section 203, communication section 204 and second storage section 205, and data calculation processing.

Figure 3:
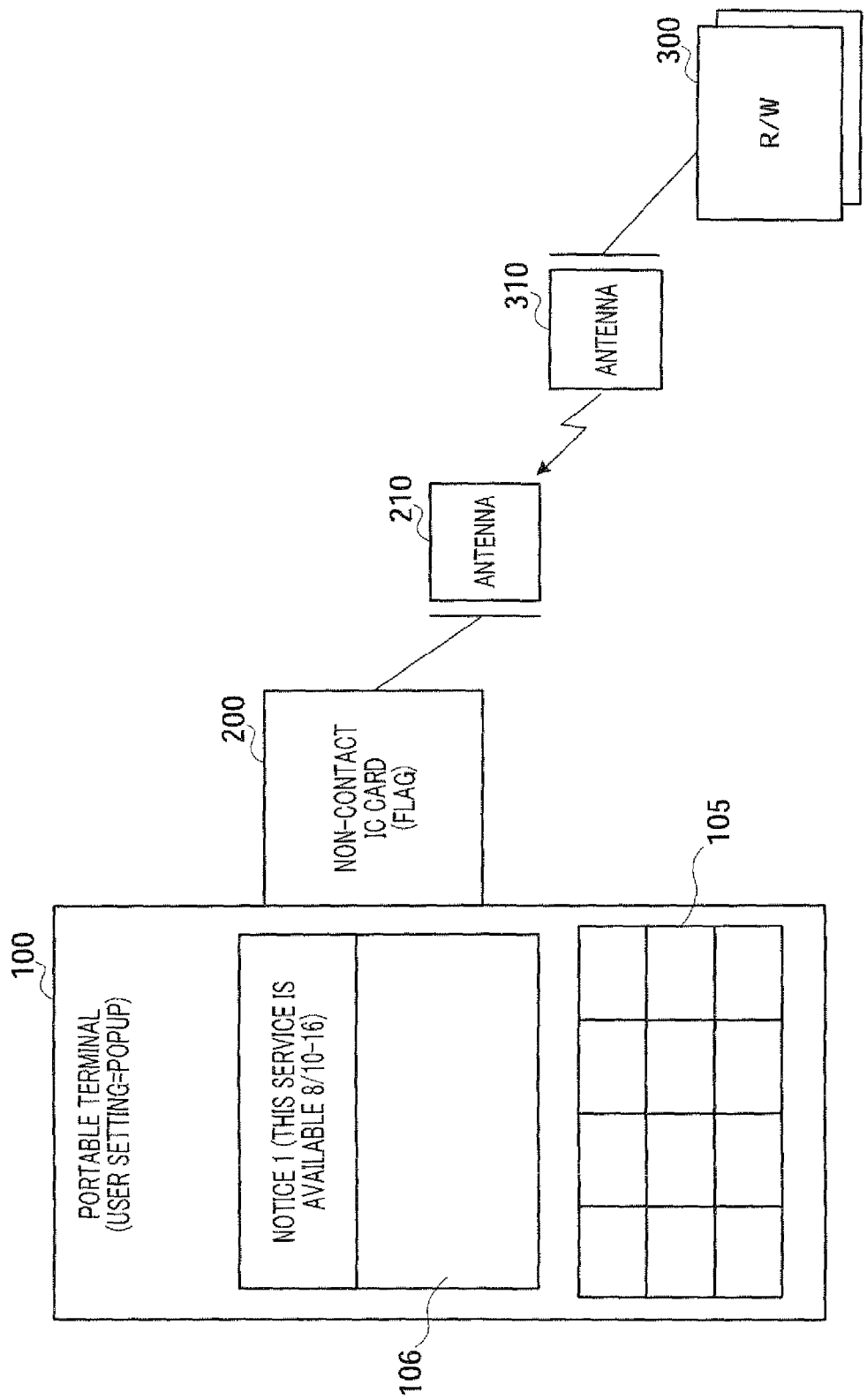
FIG. 3 is a schematic diagram illustrating an information delivery method through non-contact communication between the non-contact IC card mounted in the portable terminal and a reader/writer according to the embodiment of the present invention.

Next, an information delivery method through non-contact communication between non-contact IC card 200 mounted in portable terminal 100 of the present embodiment and reader/writer 300 will be explained. FIG. 3 is a schematic diagram illustrating the information delivery method through non-contact communication between the non-contact IC card mounted in the portable terminal according to the embodiment of the present invention and the reader/writer.

In FIG. 3, non-contact IC card 200 and reader/writer 300 transmit/receive information through non-contact communication via antennas 210 and 310.

Here, when, for example, information (message) carried in non-contact IC card 200 is displayed on portable terminal 100 at the request from the reader/writer 300 side such as a ticket examining machine at a station or POS of a convenience store, it is necessary to specify at what time and under what condition a message is displayed.

However, since non-contact IC card 200 is not an active but passive device, non-contact IC card 200 cannot operate on its own even if non-contact IC card 200 wants to push information into portable terminal 100. However, in such a simple event that non-contact processing has been completed, non-contact IC card 200 may be able to perform such a level of reaction as generating an interrupt. For example, "Osaifu-Keitai" (mobile phone with wallet function: registered trademark) receives information from the reader/writer 300 side such as POS at a station or convenience store and ToruCa (data retrieval service that uses "Osaifu-Keitai": registered trademark) receives coupons from the POS side. "Suica" (rechargeable contactless smart card: registered trademark) focuses on the function as a commutation ticket and is not provided with display section.

Furthermore, there is a demand from users that only preset necessary information be pushed out of information (messages) carried in non-contact IC card 200 of portable terminal 100.

However, while the conventional information delivery method described in Patent Document 1 can push-deliver e-mail to portable terminal 100, it is difficult to push-deliver information having conditions specific to non-contact IC card 200 to portable terminal 100 and display the information through non-contact communication without depending on user operation.

Furthermore, according to the conventional information delivery method described in Patent Document 2, it is possible to transmit information such as dates of events of a theme park, game center or the like from reader/writer 300 to portable terminal 100, whereas non-contact IC card 200 cannot perform access control about a message over portable terminal 100.

Furthermore, according to the conventional information delivery method described in Patent Document 3, for example, the post-charge balance stored in non-contact IC card 200 of "Osaifu-Keitai" (registered trademark) can be processed by the POS and displayed, whereas it is not possible to acquire a request message received from reader/writer 300 from non-contact IC card 200 according to conditions for each message and push only necessary information to portable terminal 100 and display the information.

Therefore, the information delivery method using portable terminal 100 of the present embodiment provides an event header capable of describing a condition for specifying information (data) to be displayed on portable terminal 100 in a message to be transmitted from reader/writer 300 to non-contact IC card 200. Even when the condition has not been achieved when reader/writer 300 transmits a message to non-contact IC card 200, adopting such a configuration makes it possible to asynchronously display the message on portable terminal 100 after the condition is achieved. For example, the message may be displayed immediately after the condition is achieved after a lapse of a certain period of time instead of displaying the message at the timing the message is transmitted from reader/writer 300.

On the other hand, the non-contact IC card 200 side analyzes the event header of the message transmitted from reader/writer 300, sets a flag (turns "ON" the flag) and sets the display condition of a message on portable terminal 100.

The flag set on the non-contact IC card 200 side is a flag that assign a message ID of the message transmitted from reader/writer 300 and decides whether or not the condition has been satisfied, that is, whether or not the setting condition described in the event header has been achieved.

Portable terminal 100 checks the flag as to whether the flag set on the non-contact IC card 200 side is "ON" or "OFF" and checks whether or not the setting condition is satisfied, that is, whether or not there is a message to be displayed at the request of reader/writer 300.

Through the flag check, portable terminal 100 acquires only the message that satisfies the setting condition with the flag set in the "ON" state from non-contact IC card 200 and displays the message. In other words, portable terminal 100 of the present embodiment cannot acquire or display a message that does not satisfy the setting condition with the flag set in the "OFF" state.

In this way, the non-contact IC card 200 side sets a flag to show whether or not portable terminal 100 of the present embodiment satisfies the condition to acquire the message of non-contact IC card 200.

Furthermore, by providing an event header for a non-contact communication message to be transmitted from reader/writer 300, portable terminal 100 of the present embodiment specifies information to be displayed in detail at the request from the reader/writer 300 side.

Therefore, portable terminal 100 of the present embodiment can push and display, in a pseudo-manner, only a message of interest to be displayed from the reader/writer 300 side out of messages stored in non-contact IC card 200.

In this way, while the conventional information delivery method can only perform push-delivery at the request of the portable terminal 100 side, portable terminal 100 of the present embodiment can push-deliver the information (data) set in detail at the request of the reader/writer 300 side.

That is, portable terminal 100 of the present embodiment is configured so as to display information carried in non-contact IC card 200 on display section 106 by non-contact IC card 200 receiving a message from reader/writer 300 through non-contact communication.

The message transmitted from reader/writer 300 to non-contact IC card 200 of portable terminal 100 through non-contact communication is provided with an event header capable of describing conditions specific to non-contact communication.

Figures 4, 5:
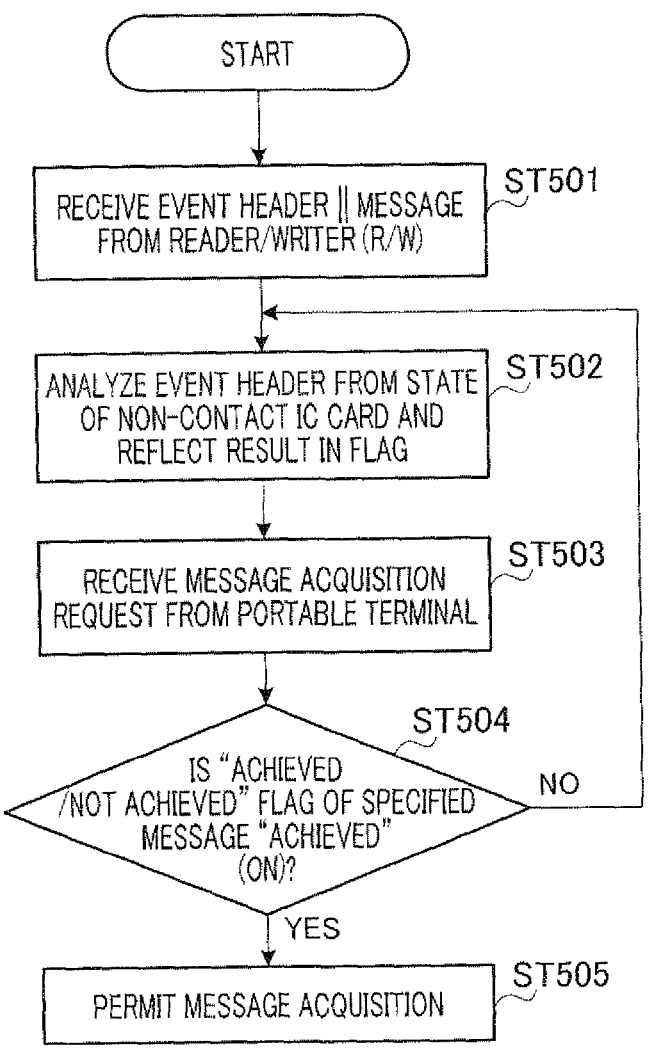
FIG. 4 shows an example of an event header provided for a non-contact communication message of the reader/writer that carries out non-contact communication with the non-contact IC card mounted in the portable terminal according to the embodiment of the present invention.
FIG. 5 is a flowchart illustrating the operation of the non-contact IC card mounted in the portable terminal according to the embodiment of the present invention.

The event header provided for the non-contact communication message transmitted from reader/writer 300 describes items {type, value, equation, essentiality, display} as shown in FIG. 4 as the display condition of information carried in the IC card.

When, for example, a message prompting for a charge to portable terminal 100 from a POS (reader/writer 300) at a convenience store is pushed and displayed under a condition that the balance of electronic money is equal to or less than 1000 yen, the event header describes a condition of {type=Money, value=1000, equation=Under, essentiality=M, display=None}.

On the other hand, when a message is pushed from reader/writer 300 at Shinagawa Station to portable terminal 100 to display a coupon or the like available at Yokohama Station under a condition that a user has arrived at Yokohama Station with a ticket, the event header describes a condition of {type=Train, value=Yokohama, equation=Equal, essentiality=M, display=Popup}.

Furthermore, when pushed from reader/writer 300 to portable terminal 100 to display a birthday card or the like under a condition that the current date is a specific day such as a birthday or date for an event, the event header describes a condition of {type-Time, value=05/09/14, equation-Equal, essentiality=O, display=Popup}.

Furthermore, when pushed from reader/writer 300 at a theme park to portable terminal 100 to display event information or the like under a condition that the count value of entries of the theme park reaches 5, which is equal to or greater than a specific count, the event header describes a condition of {type=Count, value=5, equation=Over, essentiality=O, display=Telop}.

Furthermore, when a process in which a theme park ticket is used or a movie theater ticket is punched or the like is pushed from reader/writer 300 of the theme park or movie theater to portable terminal 100 and displayed immediately after ticket processing, the event header describes a condition {type=Ticket, value=Process, equation=ASAP, essentiality=M, display=None}.

The above described event header may also be a combination of a plurality of headers and set in a composite condition.

In this way, the "type" item of the event header describes an information category to be displayed on portable terminal 100 such as "Money," "Train," "Time," "Count" and "Ticket."

Furthermore, the "value" item of the event header describes specific contents of "type" such as "100," "Yokohama," "05/09/14," "5", and "Process."

Furthermore, the "equation" item of the event header describes a state of "value" contents such as "Under," "Equal," "Over" and "ASAP." However, when the "equation" item is described as "equation=ASAP: AS SOON AS POSSIBLE," the message is required to be displayed is immediately after acquiring the message.

Furthermore, the "essentiality" item of the event header describes which request is given priority, user or R/W.

When the "essentiality" item is described as "essentiality=M: Mandatory" here, an instruction is given so as to display information carried in non-contact IC card 200 on portable terminal 100 disregards the user setting and according to the setting of the reader/writer 300 side at a convenience store, station or the like.

On the other hand, when the "essentiality" item describes "essentiality=O: Option," an instruction is given so as to display information carried in non-contact IC card 200 on portable terminal 100 giving priority to the user setting. That is, when the display of the user setting of portable terminal 100 is prohibited, the display is not performed.

Furthermore, the "display" item of the event header describes the display method of the information carried in non-contact IC card 200 is displayed on portable terminal 100 such as "None," "Popup" and "Telop."

Here, when the "display" item is described as "display=None," an instruction is given so as to display the information carried in non-contact IC card 200 on portable terminal 100 using a free display method.

Furthermore, when the "display" item is described as "display=Popup," an instruction is given so as to display the information carried in non-contact IC card 200 on portable terminal 100 in a popup.

Furthermore, when the "display" item is described as "display=Telop," an instruction is given so as to display the information carried in non-contact IC card 200 on portable terminal 100 in a telop.

Next, the operation of non-contact IC card 200 when a non-contact communication message provided with the above described event header is transmitted from reader/writer 300 will be explained. FIG. 5 is a flowchart illustrating the operation of the non-contact IC card mounted in the portable terminal according to the embodiment of the present invention.

In FIG. 5, non-contact IC card 200, which has started non-contact communication with reader/writer 300, receives a message in which an event header is set from reader/writer 300 (step ST501).

Non-contact IC card 200, which has received the message, analyzes the event header of the message through event header analyzing section 201 and performs flag setting processing to set a flag reflecting the analysis result of the event header through flag setting section 203 (step ST502).

Next, upon receiving a message acquisition request from portable terminal 100 (step ST503), non-contact IC card 200 decides whether or not there is a flag indicating achievement of the specified message (whether the flag is "ON" or "OFF") (step ST504).

Here, when it is decided that there is a flag indicating achievement of the specified message (flag is "ON"), portable terminal 100 is permitted to acquire the message (step ST505).

Figures 6, 7:
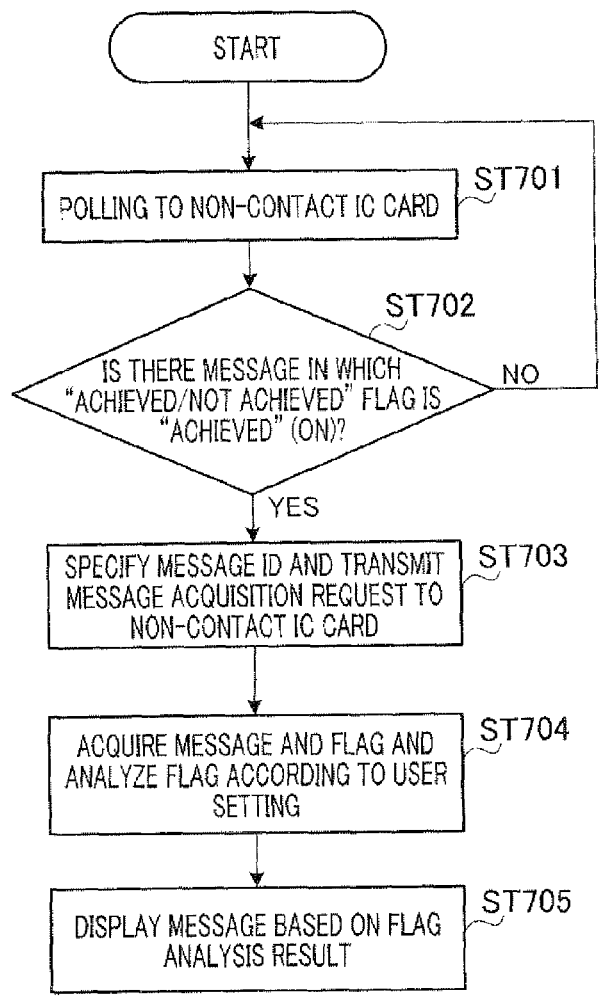
FIG. 6 shows an example of a flag set by analyzing the event header provided for a non-contact communication message of the reader/writer that carries out non-contact communication with the non-contact IC card mounted in the portable terminal according to the embodiment of the present invention.
FIG. 7 is a flowchart illustrating the operation of the portable terminal according to the embodiment of the present invention.

In the above described flag processing, flags of respective items of {message ID, achieved/not achieved, request information, essentiality, display} as shown in FIG. 6 are set.

In FIG. 6, the flag of the "message ID" item holds the state of presence/absence of a message ID (identification number) requested to be displayed on the portable terminal.

The flag of the "achieved/not achieved" item holds the state of whether the condition described in the event header has been achieved or not.

The flag of the "request information" item holds the state of the presence/absence of information necessary to decide the condition of the event header. For example, since the IC card is often not provided with a clock, date and time information is requested as information necessary to decide the condition of the event header. Upon receiving the request, portable terminal 100 acquires time information from a clock provided for an SNTP (Simple Network Time Protocol) server or portable terminal 100 and sends the time information to the IC card.

The flags of the essentiality and "display" items hold the states of the same contents as the "essentiality" and "display" items of the event header.

However, the number of card applications stored and storage area of non-contact IC card 200 vary depending on the type of the card or card manufacturing company.

Therefore, in the above described flag setting processing, flags are arranged for each card application of non-contact IC card 200 or in second storage section 205, which is a storage area common to non-contact IC cards 200 of respective card manufacturing companies.

In this way, by arranging flags in second storage section 205, which is a storage area common to the respective non-contact IC cards 200, it is possible to perform flag setting processing and make a flag check common to the respective non-contact IC cards 200 even if the type of the card or card manufacturing company varies. However, when flags are arranged in the storage area common to the respective non-contact IC cards 200, it is preferable to add an item of card application name of non-contact IC card 200 to the above described flag setting items.

Next, the operation of portable terminal 100 of the present embodiment will be explained. FIG. 7 is a flowchart illustrating the operation of the portable terminal according to the embodiment of the present invention.

In FIG. 7, portable terminal 100 permitted to acquire a message by non-contact IC card 200 periodically performs polling to non-contact IC card 200 (step ST701) and checks the flag set in the flag setting processing of non-contact IC card 200.

This flag check decides whether or not the specified message whose "achieved/not achieved" flag is "achieved" (flag indicating "ON") exists in second storage section 205 of non-contact IC card 200 (step ST702).

Here, when it is decided that the specified message whose "achieved/not achieved" flag is "achieved" (flag indicating "ON") exists in second storage section 205 of non-contact IC card 200, the message ID (identification number "1100") is specified and message acquisition section 103 transmits a message acquisition request to non-contact IC card 200 (step ST703).

Portable terminal 100 then acquires the message and flag from first storage section 202 and second storage section 205 of non-contact IC card 200 and analyzes the acquired flag through flag analyzing section 102 according to the user setting set in user setting section 101 (step ST704).

In this way, portable terminal 100 displays only the specified message described beforehand in the event header on display section 106 based on the flag analysis result in flag analyzing section 102 (step ST705).

As described above, when identification number "1100" of the message ID is found by the flag check in step ST701 and the condition described in the event header has been achieved, portable terminal 100 of the present embodiment transmits the message ID to non-contact IC card 200.

Non-contact IC card 200 authenticates identification number "1100" of the received message ID and hands over the message to portable terminal 100 when the acquisition of the message is permitted. In this way, portable terminal 100 acquires the message from non-contact IC card 200.

Here, when the condition described in the event header has not been achieved, non-contact IC card 200 does not permit portable terminal 100 to acquire the message.

Furthermore, when the message ID is found by the flag check, the condition described in the event header has not been achieved and there is no request data from portable terminal 100, non-contact IC card 200 disregards the request from portable terminal 100.

Furthermore, when the message ID is found by the above described flag check, the condition described in the event header has not been achieved and there is request information, portable terminal 100 transmits the request information to non-contact IC card 200.

Furthermore, when the message ID is found in the above described flag check, the condition described in the event header has been achieved and there is request information, portable terminal 100 transmits the request information and message ID to non-contact IC card 200 and acquires the message from non-contact IC card 200.

Furthermore, when the message ID is found by the above described flag check, the condition described in the event header has not been achieved and there is no request data from portable terminal 100, non-contact IC card 200 disregards the request from portable terminal 100.

On the other hand, when the degree of importance of the message that portable terminal 100 requests from non-contact IC card 200 is high, for example, when the message is information having a high degree of cashability such as a shopping ticket, the reliability of the request information is questionable.

Therefore, portable terminal 100 of the present embodiment adds authentication information such as digital signature or MAC (Message Authentication Code) to the request information, non-contact IC card 200 verifies the authentication information such as digital signature or MAC and assumes that the condition has been achieved when the authentication information is correct. However, in the case of MAC, it is essential to share secret information beforehand.

The digital signature or MAC may be attached to the time information acquired from the clock of SNTP server or portable terminal 100

In the case of "essentiality=O" in the above described flag check, the message is acquired from non-contact IC card 200 according to the condition set in portable terminal 100.

Furthermore, portable terminal 100 displays the message acquired from non-contact IC card 200 using a flag.

Furthermore, the method of displaying a message by portable terminal 100 follows the method of displaying a flag.

On the other hand, in the case of "essentiality=O" in the above described flag check, the message acquired from non-contact IC card 200 is displayed according to the user setting.

Furthermore, in the case of "display=Popup" in the above described flag check, if "user setting=Telop," "telop" is displayed. This can minimize the unintended operation of the user.

However, when the message needs to be displayed conspicuously by any means for reasons related to the service at the request of reader/writer 300 side, portable terminal 100 of the present embodiment makes it possible to invalidate the user setting by setting "essentiality=M" to avoid the message from becoming inconspicuous by the user setting.

As described above, since portable terminal 100 and information delivery method of the present embodiment allow conditions specialized for non-contact IC card 200 to be added to each message transmitted from reader/writer 300, it is possible to push-deliver and display, on display section 106 of portable terminal 100, information having conditions specific to non-contact IC card 200, for example, display of a coupon when the balance of electronic money exceeds a predetermined a certain amount of money or information such as shop information in the neighborhood when the user arrives at a specific station without depending on user operation.

Furthermore, portable terminal 100 and the information delivery method of the present embodiment makes it possible to acquire a request message received from reader/writer 300 from non-contact IC card 200 according to conditions for each message and display the request message on display section 106 of portable terminal 100.

Furthermore, portable terminal 100 and the information delivery method of the present embodiment allows non-contact IC card 200 to perform access control over portable terminal 100 for the message requested from reader/writer 300.

INDUSTRIAL APPLICABILITY

The portable terminal and the information delivery method according to the present invention can push-deliver and execute, in a pseudo-manner, processing described in a message acquired from a non-contact IC module through non-contact communication, which is difficult to be connected all the time, at the request of a reader/writer, and is therefore suitable for use as a portable terminal mounted with a non-contact IC module that carries out non-contact communication, which is difficult to be connected all the time with a reader/writer and an information delivery method.

The invention claimed is:

1. A portable terminal mounted with a non-contact IC module that receives at least one message transmitted from a reader/writer through a non-contact communication, the at least one message transmitted from the reader/writer comprising:

an event header describing a setting condition for specifying processing to be executed by the portable terminal, the non-contact IC module comprising:

an event header analyzing section that analyzes the event header provided in the at least one message received from the reader/writer; and a flag setting section that sets a flag reflecting a status of the setting condition described in the event header analyzed by the event header analyzing section, and the portable terminal comprising:

a message acquisition section that transmits, to the non-contact IC module, a message acquisition request including authentication information for verifying reliability of the message acquisition request, and, when the authentication information verifies that the message acquisition request is reliable, acquires, from the non-contact IC module which has received the at least one message, only a specific message from among the at least one messages that has achieved the setting condition described in the event header;

a flag analyzing section that searches whether or not there is any of the at least one messages that can be acquired from the non-contact IC module, by analyzing the setting condition status flag set by the flag setting section of the non-contact IC module, to decide whether or not any of the at least one messages have achieved the setting condition described in the event header; and a processing section that executes the processing described in the specific message acquired by the message acquisition section.

2. A non-contact IC module mounted in a portable terminal that receives at least one message transmitted through a non-contact communication from a reader/writer, the at least one message transmitted from the reader/writer comprising;

an event header that describes a setting condition for specifying processing to be executed by the portable terminal, the non-contact IC module comprising:

an event header analyzing section that analyzes the event header provided in the at least one message received from the reader/writer; and a flag setting section that sets a flag reflecting a status of the setting condition described in the event header analyzed by the event header analyzing section, wherein:

the non-contact IC module is configured to receive a message acquisition request from the portable terminal, the message acquisition request including authentication information for verifying reliability of the message acquisition request; and when the setting condition status flag set by the flag setting section has achieved the setting condition described in the event header, and when the authentication information is verified to be reliable, the portable terminal is permitted to acquire the at least one message.

3. The non-contact IC module according to claim 2, wherein the flag is a flag that permits the portable terminal to acquire the at least one message with priority given to a user setting.

4. The non-contact IC module according to claim 2, wherein the flag is a flag that permits the portable terminal to acquire the at least one message disregarding a user setting.

5. An information delivery method for transmitting at least one message transmitted from a reader/writer to a non-contact IC module mounted in a portable terminal through a non-contact communication, the at least one message transmitted from the reader/writer comprising:
an event header describing a setting condition for specifying processing to be executed by the portable terminal, the non-contact IC module being configured to perform:
an event header analyzing step of analyzing the event header provided in the at least one message received from the reader/writer;
a flag setting step of setting a flag reflecting a status of the setting condition described in the event header analyzed in the event header analyzing step;
a message acquisition request receiving step of receiving a message acquisition request from the portable terminal, the message acquisition request including authentication information for verifying reliability of the message acquisition request; and
a message acquisition permitting step of permitting, when the setting condition status flag specified by the message acquisition request from the portable terminal has achieved the setting condition described in the event header, and when the authentication information verifies that the message acquisition request is reliable, the portable terminal to acquire a specific message from among the at least one messages, and the portable terminal being configured to perform:
a flag analyzing step of searching whether or not there is any of the at least one messages that can be acquired from the non-contact IC module, by analyzing the setting condition status flag set during the flag setting step, to decide whether or not any of the at least one messages has achieved the setting condition described in the event header;
a message acquiring step of acquiring only the specific message, the specific message being decided in the flag analyzing step to have achieved the setting condition described in the event header, and the specific message being permitted to be acquired by the portable terminal in the message acquisition permitting step from the non-contact IC module; and
a processing step of executing the processing described in the specific message acquired during the message acquiring step.

* * * * *